Aug. 8, 1933.     F. A. KING     1,920,988
MECHANICAL MOVEMENT
Filed July 21, 1931     3 Sheets-Sheet 2

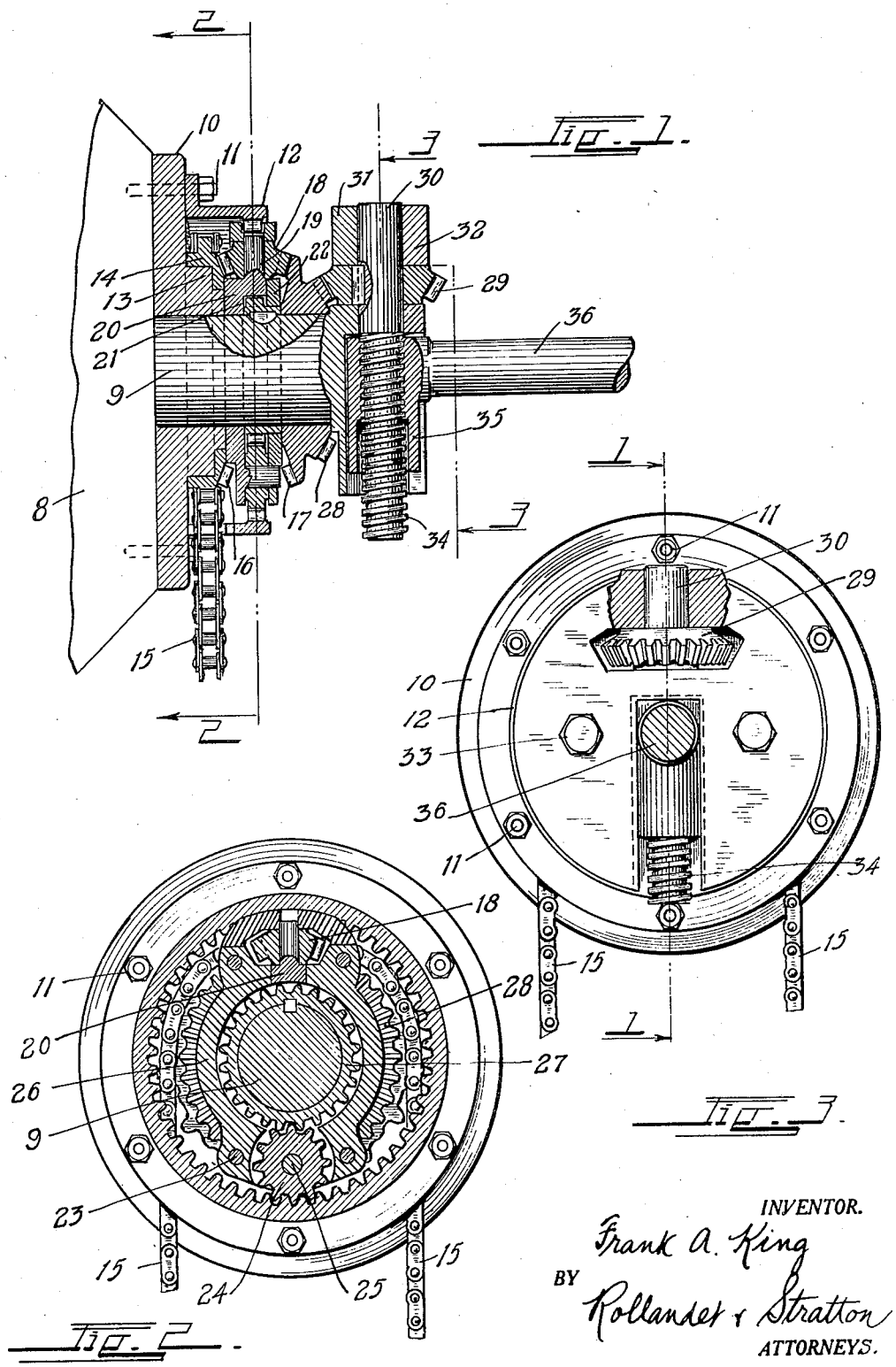

INVENTOR.
Frank A. King
BY Rollander + Stratton
ATTORNEYS.

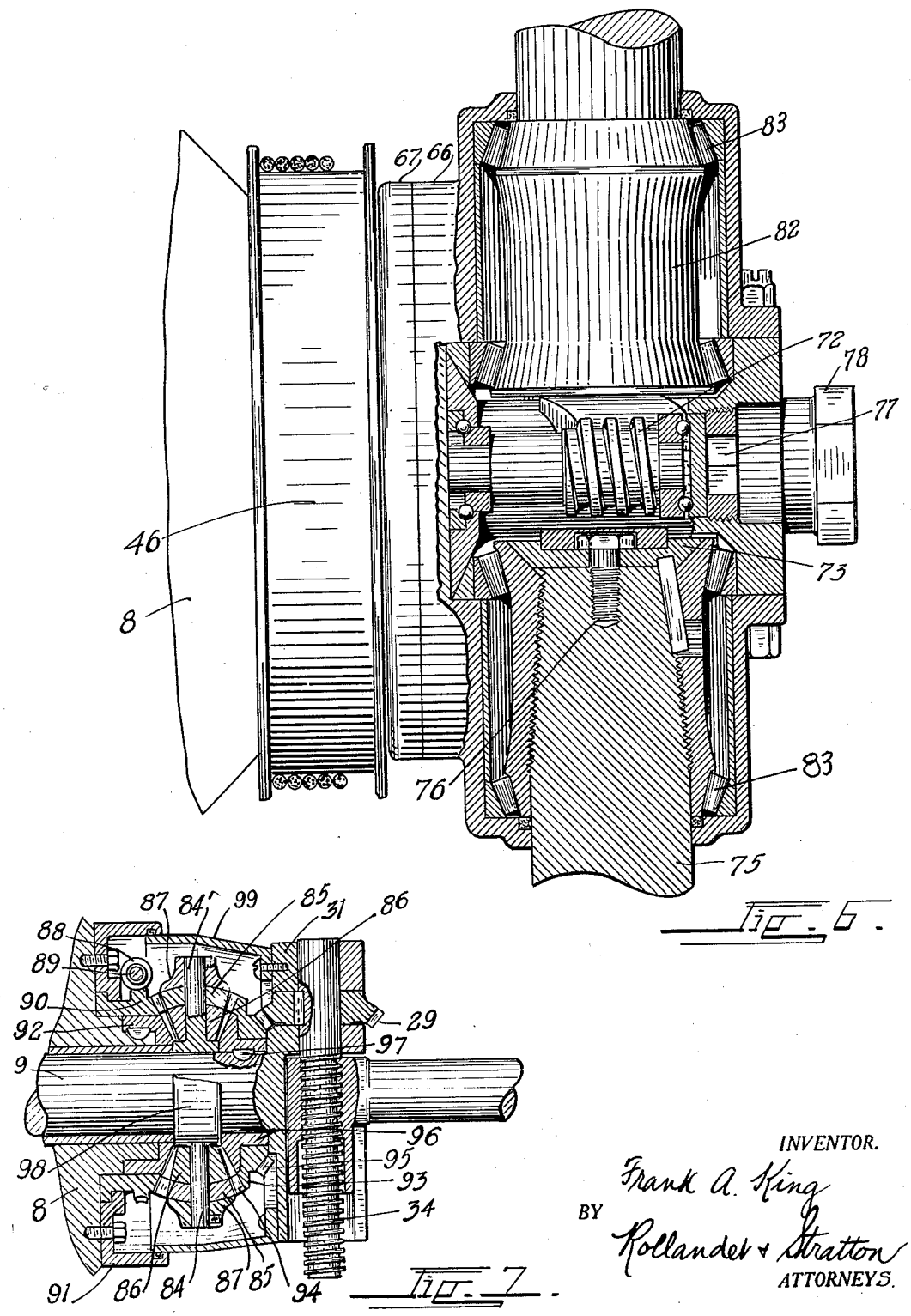

Patented Aug. 8, 1933

1,920,988

UNITED STATES PATENT OFFICE 1,920,988

MECHANICAL MOVEMENT

Frank A. King, Englewood, Colo.

Application July 21, 1931. Serial No. 552,117

14 Claims. (Cl. 74—7)

My invention relates to mechanical movements, and particularly to means for adjusting a rotary element during its rotation. Heretofore, mechanisms of this nature have been provided with longitudinally adjustable yokes or intermittently operated clutch or brake connections. These, however, were objectionable, for the former was found to be limited as to its stroke and the latter was uncontrollable as to its stroke.

An important object of the invention is to transmit at will independent movement to an element of a rotary body, during rotation, by direct gear connection with an external, intermittent source of power. Another object is to provide means to control the speed and/or path of travel of said element.

A further object is to provide means to control movements of a reciprocating member on a rotary body, during rotation of the latter.

A still further object is to provide positive means whereby the adjustable parts of the invention will be self-locked, when not being adjusted. Another object is to provide reduction means in order that a relatively great amount of motion is necessary to make a small adjustment of the element or member of the rotary body. This affords great accuracy and precision in the present invention.

Another object lies in providing such a mechanism that is adaptable as a reduction gearing with but slight changes of the pitch of the gearing, and to produce considerable reduction ratio with but few moving parts.

Still other objects reside in details of construction and in novel combinations and arrangements of parts, which will appear in the course of the following description.

The main object of this invention is to provide a manually controlled gear in mesh with a planetary gear train having floating intermediate members in connection with an element which normally rotates as a unit with a rotating element.

Reference is made to my co-pending application Serial No. 417,080, filed December 28, 1929, on Adjustable propeller.

It is to be understood that while the drawings show and the following specification describes several uses of the invention, I do not wish to be limited to such uses. The present invention lies primarily in the mechanism for adjusting a part of a rotary body during its rotation.

In the drawings, like reference characters designate similar parts in the several views.

Figure 1 is a longitudinal section through an embodiment of the invention.

Figures 2 and 3 are sectional views taken on the lines 2—2 and 3—3 respectively of Figure 1.

Figure 6 is a composite section taken on the line 6—6 of Figure 4.

Figure 7 is a longitudinal section of another modification.

Figure 4:
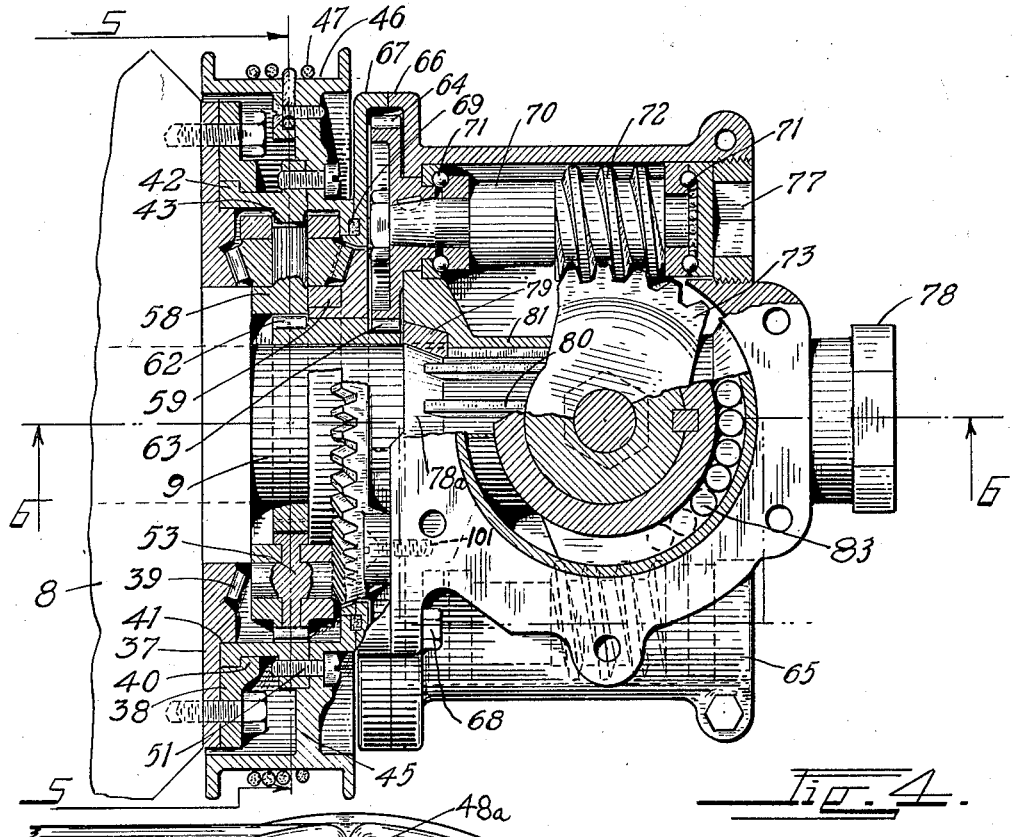
Figure 4 is a longitudinal section through a modified mechanism embodying my invention.

Referring more in detail to the invention, the reference numeral 8 designates a base or other relatively stationary supporting element upon which the mechanism is mounted. A shaft 9 is driven by power means (not shown). A shouldered base plate 10 is bolted to the supporting element 8 by bolts 11, which mount an internal ring gear 12 on the base plate.

Two faces of a shoulder 13 on the stationary base plate rotatably support a sprocket 14, which meshes with a chain 15. The chain may be manually operated, either directly or through intermediary sprocket means.

The sprocket 14 also carries an integral, bevel gear 16. Opposite the latter gear is another bevel gear 17, which is loose on the shaft 9. The two gears are of the same diameter and their edges form similar angles with the vertical.

Engaging these two bevel gears is an idler or bevel gear 18, rotatably supported on a stub shaft 19 on a floating cross arm or spider 20 that is composed of two complementary members 21 and 22 held together by rivets 23. At the opposite pole on the cross arm is a planetary gear 24 loosely mounted on a stub shaft 25 on the cross arm. The stub shaft 19 is radial of the shaft 9 whereas the stub shaft 25, which is integral with the member 21, is parallel with the shaft 9. The pinion 24 meshes with the internal ring gear 12.

Within the central portion 26 of the cross arm, as shown in Figure 2, is a driving gear 27 keyed to the shaft 9. This driving gear engages the planetary gear 24. The gear 17, which is a unitary gear, has another annular, bevel gear 28, which meshes with a bevel gear 29 of the mechanism to be adjusted. The gear 29 is keyed to a counter shaft 30 that is transverse to the shaft 9. The unitary gear normally rotates with the rotary element on the shaft.

A head 31 is formed on the end of the shaft 9. A complementary plate 32 is clamped to the head 31 by bolts 33, to provide a bearing for the counter shaft 30. The latter shaft has an adjusting threaded end 34 that carries a threaded sleeve 35, which in turn carries a mounting bar 36 for a boring bit, an adjustable crank pin, or the like.

Figure 5:
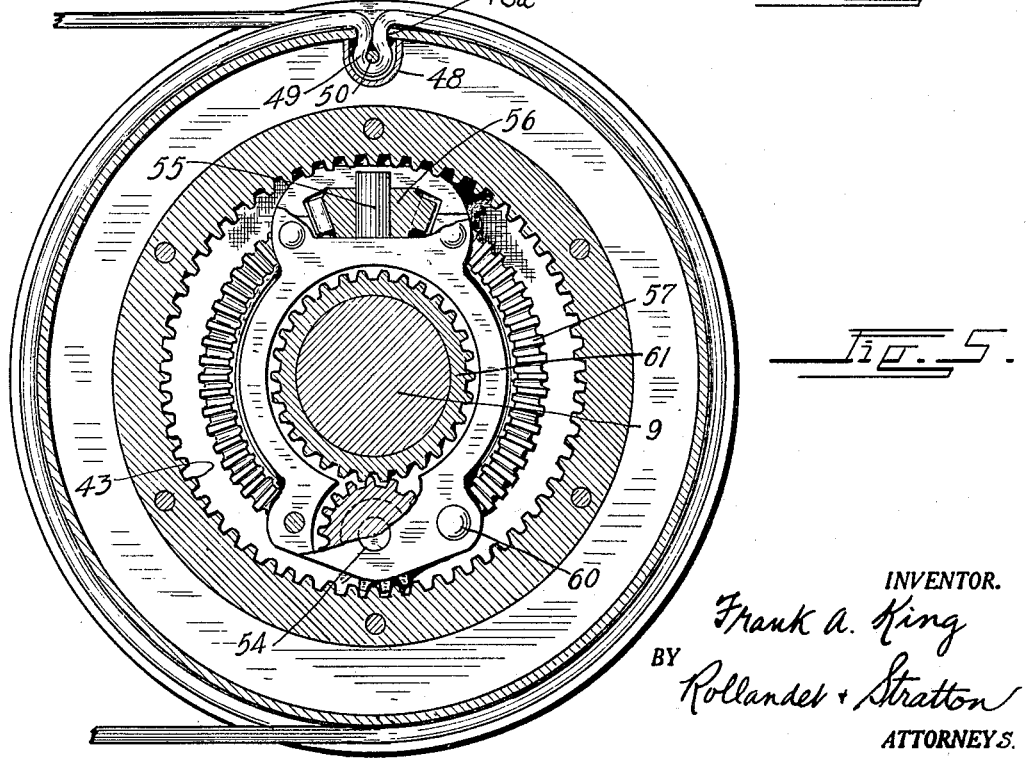
Figure 5 is a sectional view taken on the line 5—5 of Figure 4.

In the modification shown in Figures 4, 5 and 6, the base or other relatively stationary supporting element is again designated by the numeral 8. A base plate 37 and a clamping member 38 are bolted to the supporting element. The base plate has an annular, bevel gear 39. Rotatably supported between a lip 40 on the clamping member and a shoulder 41 on the base plate is a flange 42 of an internal ring gear 43. A drum 46 for the application of a cable 47 is fastened to the ring gear 43 by bolts 51. The drum has a shell 48. A loop 49 of the cable is passed through an aperture 48a and around a small bolt 50 in the shell.

The internal ring gear 43 engages a planetary gear 53, which is integral with and rotates with its shaft 54, the bearings for which are on a cross arm or spider composed of complementary members 58 and 59. Rivets 60 hold the complementary members together. Diametrically opposed to the shaft 54 on the cross arm is a radial shaft 55. The latter shaft supports a beveled pinion 56 that meshes with the annular gear 39 and with an opposed annular gear 57 that is loose on a sleeve gear 61 that is free to rotate on the shaft. The gear 57 is bolted to a hub housing, hereinafter to be described. The unitary sleeve gear has two series of teeth 62 and 63. The teeth 62 engage the planetary gear 53, while the teeth 63 engage spur gears 64 hereinafter more fully described.

The annular gear 57 is bolted to a hub housing 65 by bolts 101, whereby to rotate together. The housing has flanged members 66 and 67 that are fastened together by bolts 68. Said flanged members house two of the spur gears 64 (one within the flanged members at the lower part of Figure 4). Packing 69 is disposed between member 67 and part of the web of the drum 46.

The spur gears 64 are keyed to shafts 70, which are mounted on ball bearings 71 in the hub housing. Nuts 77 provide access to these parts. Each of the shafts 70 carries a worm 72 that drives a gear segment 73 that is fastened to shank 75 of a propeller blade for aeroplanes by a bolt 76. A nut 78 secures the hub housing to the drive shaft 9.

The drive shaft 9 has a tapering shoulder 78a. An annular thrust bearing 79 engages this shoulder. A plurality of splines 80 cause a hollow hub member 81 to rotate with the shaft. Tapered sleeves 82, screwed on the shanks 75 of the propeller blades, rotate on roller bearings 83.

The mechanical movement of the modification shown in Figure 7 is taken from my said copending application, and, therefore, this application is a continuation-in-part of said co-pending application.

This form is marked by the provision of radially disposed arms or shafts 84 on a collar 98 loose on the shaft 9, each of which shafts carries adjacent bevel gears 85 and 86. A split ring 87 holds the gears 85 and 86 on the stub shafts.

The controlling mechanism comprises a worm 88 on a shaft 89. A ring gear 90, operated by the worm, in turn rotates the gears 85. A clamping member 91 rotatably supports the ring gear 90. An annular stationary bevel gear 92, that is keyed to base 8, engages gears 86. The gear 90 rotates upon gear 92. A ring gear or unitary gear 93 carries series of teeth 94 and 95. The series 94 engages the bevel gears 85 opposite the ring gear 90 and the series 95 engages gear 29, similar to that shown in Figure 1. A sleeve gear 96 is keyed to the shaft, as shown at 97, and meshes with gears 86. The ring 93 normally rotates as a unit with gear 96.

The rotary element and the adjustable member are as shown in and described with reference to Figure 1, except that a housing 99 is fastened to the head 31.

In the operation of my invention, the shaft 9 is driven by a source of power (not shown). The driving gear 27, being keyed to the shaft rotates therewith. The function of the planetary gear 24, which meshes with the driving gear and internal gear 12, is to maintain the cross arm in the desired positions. As a result thereof, the cross arm rotates at half the speed of the driving gear in the ratio shown in the drawings. It is to be understood that changes may be made in the ratios shown without departing from the spirit and scope of the invention.

The bevel gear 18 idly rotates on the cross arm between the ring gears 16 and 17, until an adjustment is to be made. When an adjustment is to be made of a member on the element rotated by the shaft, the chain 15 is moved. As stated, this motion is transmitted through the train of gears described as follows: Chain 15, sprocket 14, bevel gear 16, gear 18, bevel gear 17, annular gear 28, and gear 29, the rotation of the latter causing the rotation of the adjusting screw 34. The screw 34 controls lateral movements of the bar 36 through the intermediary of the sleeve 35.

When adjustments are not being made, the chain is held against longitudinal movement. By this arrangement, the gear 18 is being idly rotated between a relatively stationary ring gear 16 and annular gear 17, which, though loose on the shaft, is rotating at the same speed as the shaft 9 due to the friction between the latter gear and the shaft and due to the engagement with gear 29, which is rotating with the shaft.

The modification in Figures 4, 5 and 6 is the reverse of that in Figures 1, 2 and 3. In this construction, a cable 47 is used to control the adjustable member on the rotary element. The operation of the elements to effect this adjustment will now be described.

Here the bevel gear 56 functions to maintain the cross arm in desired positions. The planetary gear 53 on the opposite end of the cross end meshes with the unitary ring gear 62, which is loosely mounted on the drive shaft 9, and with the internal gear 43. The planetary gear 53, which, when not being employed to make adjustments, is an idler. The bevel gear rotates between the stationary bevel gear 39 and the rotating bevel gear 57.

Thus the train of gears for effecting the adjustment in this modified construction is as follows: Stationary gear 39, bevel gear 56, rotary bevel gear 57, the planetary gear 53, the gear 62, its integral ring gear 63, the spur gear 64, and the gear segment 73 is then rotated by the worm 72 on the counter shaft 70 that is driven by the spur gear 64.

To effect an adjustment, the cable 47 is moved lengthwise, which rotates the drum 46. This movement of the drum causes the simultaneous rotation of the internal gear 43, which upsets the normally ineffective motion of said train of gears. By this means the gear segment 73 is rotated clockwise or counter-clockwise depending upon the direction of rotation of the drum 46. No lock is necessary to hold the propeller blades in position, since due to the pitch of the threads of the worm, the teeth of the gear segment are locked in the worm threads.

The operation of Figure 7 is believed clear from the foregoing. The control element consists of the worm 88 and its shaft 89. The relatively stationary gear is 92, the gear that is fastened to the shaft is 96 and the unitary gear through which all movements are transmitted is shown at 93. As has been described, the gears 85 engage the control gear 90 and the unitary gear 93, while the gears 86 engage the stationary gear 92 and the shaft gear 96. The radial shafts connect the two gear trains.

It should be clearly understood that changes may be made in the construction, operation and arrangements of parts without departing from the spirit and scope of the invention, as outlined in the hereunto appended claims.

What I claim and desire to secure by Letters Patent is:

1. Mechanism of the character described comprising a rotary shaft, a rotary element driven by the shaft, a member mounted to rotate with the element but movable relative thereto, and mechanism to effect said relative movement comprising a stationary gear, a gear connected to rotate with the shaft, a planetary gear engaging the last-mentioned gear and the stationary gear, a cross arm carrying the planetary gear, a spur gear on the cross arm, a gear engaging the spur gear and connected to operate the relatively movable member, a manually controlled gear also meshing with the spur gear, and means to operate the manually controlled gear.

2. Mechanism of the character described comprising a rotary shaft, a rotary element driven by the shaft, a member mounted to rotate with the element but movable relative thereto, an adjusting gear on the rotary element connected to cause the relative movement of the member on said element, and mechanism to effect said relative movement comprising a stationary gear, a gear connected to rotate with the shaft, a planetary gear engaging the last-mentioned gear and the stationary gear, a cross arm carrying the planetary gear, a spur gear on the cross arm, a gear engaging the spur gear and meshing with the adjusting gear, a manually controlled gear also meshing with the spur gear, and means to operate the manually controlled gear.

3. Mechanism of the character described comprising a drive shaft, a gear mounted on the shaft, a relatively stationary gear, a floating gear element including a planetary gear and a spur gear, a manually controlled gear and an adjustable element, the spur gear engaging the manually controlled gear and having a gear connection with the adjustable element, and the planetary gear engaging the stationary gear and the gear on the shaft.

4. Mechanism of the character described comprising a drive shaft, a gear mounted on the shaft, a relatively stationary gear, a floating gear element including a cross arm carrying a counter-shaft parallel with the drive shaft and a counter-shaft radial of the drive shaft, a planetary gear rotatably supported on the parallel shaft and a spur gear rotatably supported on the radial shaft, manually controlled gear and an adjustable element, the spur gear engaging the manually controlled gear and connected with the adjustable element, and the planetary gear engaging the stationary gear and the gear on the shaft.

5. Mechanism of the character described comprising a drive shaft, a gear mounted to rotate with the shaft and a gear loosely mounted on the shaft, an adjustable member rotatable with the shaft and connected to be adjusted by the last-mentioned gear, a relatively stationary gear member, a manually controlled gear, a floating gear element having a radial shaft and a shaft parallel to the drive shaft, a beveled gear on the radial shaft and a spur gear on said parallel shaft, the gears on said floating element engaging all of the other gears.

6. Mechanism of the character described comprising two gear trains, a drive shaft and an adjustable element rotating with the shaft, one train comprising a manually controlled gear, a spur gear and a gear loosely mounted on the shaft and connected with the adjustable element, the other train of gears comprising a stationary gear, a planetary gear rotating on an axis radial of the drive shaft and a gear fixed on the shaft, the two trains being connected by a cross arm rotatably supporting the spur gear and the planetary gear.

7. Mechanism of the character described comprising a drive shaft, a gear mounted on the shaft, a relatively stationary gear, a floating gear element including a planetary gear, a spur gear and complementary members of a cross arm rotatably supporting the planetary and spur gears, a manually controlled gear and an adjustable element, the spur gear engaging the manually controlled gear and connected with the adjustable element, and the planetary gear engaging the stationary gear and the gear on the shaft.

8. Mechanism of the character described comprising a drive shaft, a gear mounted on the shaft, a relatively stationary internal gear, a floating gear element, a manually controlled gear, and adjustable element, the floating gear element engaging the internal gear, the gear on the shaft and the manually controlled gear and connected to effect the adjustment of the adjustable element.

9. Mechanism of the character described comprising a drive shaft, a gear loosely mounted on the shaft, an element rotatable with the shaft and an adjustable member on the rotary element, a ring gear connected to rotate with the rotary element, a relatively stationary gear, a floating gear element including a planetary and a spur gear, and a manually controlled gear element, the spur gear engaging the stationary gear and the ring gear, and the planetary gear meshing with the gear loosely mounted on the shaft and with the manually controlled gear element.

10. Mechanism of the character described comprising a supporting member having a stationary gear, a manually controlled gear, clamping means rotatably supporting the last-mentioned gear on the support, a drive shaft, a double sleeve gear on the shaft, a planetary gear engaging one gear on the sleeve and an adjusting gear engaging the other gear on the sleeve, a gear loosely mounted on the sleeve gear and connected to rotate with the shaft, a spur gear meshing with the stationary gear and with the gear loosely mounted on the sleeve, a floating cross arm carrying the planetary and spur gears, and an adjustable member rotatable with the shaft and disposed to be controlled by the adjusting gear.

11. Mechanism of the character described comprising a drive shaft, a sleeve gear on the shaft, a rotating cross arm on the sleeve, an internal gear around the cross arm, a stationary gear, an element rotating with the shaft, an adjustable member on said element, a ring gear around the sleeve and mounted to rotate with the rotary element, a spur gear on the cross arm, meshing with the stationary and ring gears, a planetary gear on the cross arm engaging the internal gear and the sleeve gear, the adjustable member being connected to be operated by the sleeve gear.

12. Mechanism of the character described comprising a drive shaft, an element rotatable with the shaft and an adjustable member on the rotary element, a ring gear mounted to rotate with the rotary element and a gear loosely mounted on the shaft, said adjustable member connected to be operated by the last mentioned gear, a relatively stationary gear member, a manually controlled gear, and a floating gear element engaging all of said gears and transmitting all movements of the manually controlled gear through the gear that is loosely mounted on the shaft.

13. Mechanism of the character described comprising a drive shaft, a gear fixed on the shaft, a gear loosely mounted on the shaft, an adjustable member rotatable with the shaft and connected to be adjusted by the last-mentioned gear, a relatively stationary gear, an adjustably controlled gear, a spider, a spur gear and a beveled gear on the spider, the spur gear being in mesh with the first-mentioned gear and the stationary gear, and the beveled gear being in mesh with the loosely mounted gear and the adjustably controlled gear, whereby to transmit all movements of the adjustably controlled gear through the loosely mounted gear.

14. Mechanism of the character described, comprising two gear trains, a drive shaft, a rotary element driven by the shaft and having an adjustable member, one train comprising a relatively stationary gear, a spur gear and a ring gear fixed to rotate with the shaft, the other train comprising an adjustably controlled gear, a planetary gear, a gear loosely mounted on the shaft and a gear controlling said member, and a spider co-axial with and movably mounted on the shaft and provided with a radial shaft and a shaft substantially parallel with the drive shaft, the spur gear being loosely mounted on said parallel shaft and the planetary gear being loose on the radial shaft, the two gear trains being connected by the spider.

FRANK A. KING.